F. R. MORIAN.
CASTING BAIT.
APPLICATION FILED AUG. 16, 1917.
1,288,118.
Patented Dec. 17, 1918.
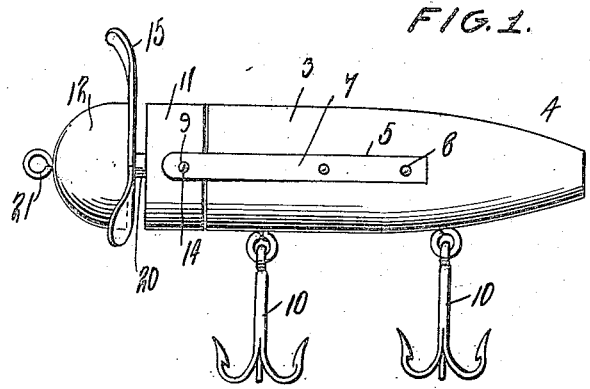
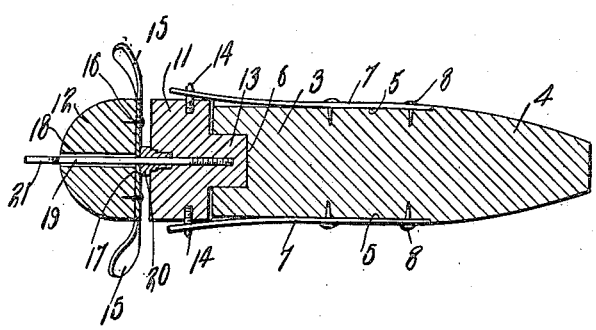
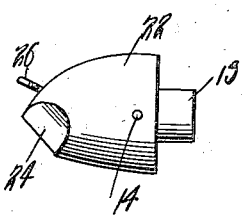
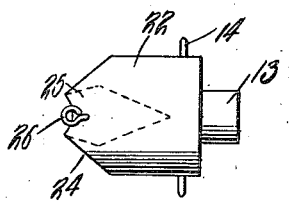
WITNESSES
INVENTOR
F. Raymond Morian
BY
ATTORNEY

UNITED STATES PATENT OFFICE.

F RAYMOND MORIAN, OF OLEAN, NEW YORK.

CASTING-BAIT.

1,288,118. Specification of Letters Patent. Patented Dec. 17, 1918.

Application filed August 16, 1917. Serial No. 186,546.

*To all whom it may concern:*

Be it known that I, F RAYMOND MORIAN, citizen of the United States, residing at Olean, in the county of Cattaraugus and State of New York, have invented certain new and useful Improvements in Casting-Bait, of which the following is a specification.

My invention relates to artificial fishing baits and aims to provide a device, which may be used for casting or trolling.

An important object of the invention is to provide a device of the above mentioned character, whereby the head of the same, may be readily removed from the body of the bait, and one of a different design replaced, thus eliminating a great number of treble hooks to be carried by the fisherman.

Another object of my invention is to provide a device of the above mentioned character, having assembled therewith, a head adapted to rotate as the bait is drawn through the water.

Other objects and advantages of the invention will be apparent during the course of the following description.

In the accompanying drawings forming a part of this specification and in which like numerals are employed to designate like parts throughout the same, Figure 1 is a side elevation of the improved bait.

Fig. 2 is a central longitudinal sectional view through the same.

Fig. 3 is a side elevation of one of the several heads which may be used and,

Fig. 4 is a top plane view of the same.

In the drawings, wherein for the purpose of illustration is shown a preferred embodiment of my invention, the numeral 3 designates the body of the bait, which is formed of an elongated piece of material, circular in cross section, and is tapered rearwardly as shown at 4. This body is provided with two elongated recesses 5, arranged upon opposite sides thereof and extend from the forward end, a substantial distance rearwardly. The numeral 6 designates a recess, circular in cross-section, in the forward end of the body of the bait, the purpose of which will be hereinafter described. Arranged longitudinally in the recesses 5 are spring arms 7, which extend a substantial distance beyond the forward end of the body. These arms are secured in the recesses by means of tacks or screws 8 as shown, and are provided with an opening 9, for a purpose to be presently described. By the resiliency of these arms and their connection with the body, the free ends of the arms are normally urged inwardly toward the body. The body 3 is provided with two depending hooks 10.

The head of the bait is divided between its ends to provide a stationary rear section 11 and a rotatable forward section 12. The section 11 is provided with an axially extending shank 13, which is adapted to snugly fit in the opening or recess 6. This section is also provided with two pins 14, arranged upon opposite sides thereof and are adapted to register with the openings 9 in the spring arms, for removably securing the head to the body. The spinner 15 is securely mounted upon the rear end of the section 12 by means of tacks or screws 16, and is provided with a central opening 17. The section 12 is also provided with an axially extending opening 18, larger in diameter than the screw 19, to receive the same. This screw rotatably mounts the section 12 upon section 11 by means of passing through the opening 18, the opening 17, the bearing 20 and screwing into the section 11. The bearing 20 aims to separate the two sections in order that a free rotary movement of the section 12 may be obtained. The numeral 21 designates an eyelet formed upon the forward end of the screw for securing the bait to the line.

In case the rotatable head is not desired to be used, a stationary head 22 may be substituted. The head may be cut as shown by the numerals 24 and 25 to give a rotary movement to the bait. The numeral 26 designates an eyelet, to which the line is attached. In use the bait is attached to the line by the eyelet 21, and is then cast into the water. As the line is trolled along, the water pushing against the spinner 15, causes the section 12 to rotate. To remove the head, the spring arms 7 must be raised out of engagement with the pins 14, then by pulling forwardly, on the eyelet, the head slips out.

It is to be understood that the form of my invention herewith shown and described is to be taken as a preferred example of the same and that various changes in shape, size, arrangement of parts may be resorted to without departing from the invention or the scope of the subjoined claim.

Having thus described my invention, I claim:

A casting bait comprising a body provided with an axially extending recess in the forward end thereof, a pair of spring arms secured to the body and each being provided with an opening in its forward end, the free end of said arms being normally urged inwardly toward the body by their own resiliency, and their connection with said body, a head detachably secured to the body and provided with an axially extending shank to snugly fit the recess in the body, and a pair of pins secured to said head for engagement with the openings in the spring arms.

In testimony whereof I affix my signature in presence of two witnesses.

F RAYMOND MORIAN.

Witnesses:
HENRY E. HALL,
THEODORE M. GODFREY.